United States Patent [19]
Lahlouh et al.

[11] Patent Number: 5,101,657
[45] Date of Patent: * Apr. 7, 1992

[54] SENSORS FOR DETECTING AND LOCATING FLUIDS

[75] Inventors: John Lahlouh, San Jose; Ray F. Stewart, Redwood City; Robert S. Wasley, San Carlos; Paul D. Hauptly, Fremont; Laurence M. Welsh, Palo Alto, all of Calif.

[73] Assignee: Raychem Corporation, Menlo Park, Calif.

[*] Notice: The portion of the term of this patent subsequent to May 15, 2007 has been disclaimed.

[21] Appl. No.: 519,975

[22] Filed: May 7, 1990

Related U.S. Application Data

[63] Continuation of Ser. No. 838,725, Mar. 11, 1986, Pat. No. 4,926,165, which is a continuation-in-part of Ser. No. 787,278, Oct. 15, 1985, abandoned, which is a continuation-in-part of Ser. No. 744,170, Jun. 12, 1985, abandoned.

[51] Int. Cl.⁵ ............................................. G01M 3/16
[52] U.S. Cl. .................................. 73/40.5 R; 73/40; 340/604
[58] Field of Search ............... 73/40 R, 40 T, 40.5 R, 73/432.1; 200/61.04, 61.05; 340/603, 604, 605

[56] References Cited

U.S. PATENT DOCUMENTS

| | | | |
|---|---|---|---|
| 1,772,232 | 8/1930 | Van Guilder | 200/61.05 |
| 2,360,434 | 10/1944 | Manning | 200/61.04 |
| 2,432,367 | 12/1947 | Andresen | 200/61.04 |
| 2,563,341 | 8/1951 | Kettering | 200/61.05 |
| 2,716,229 | 8/1955 | Werhmann | 340/242 |
| 3,427,414 | 2/1969 | Sheldahl | 200/61.04 |
| 3,465,109 | 12/1969 | Williams | 200/33 |
| 3,470,340 | 9/1969 | Hakka | 200/61.04 |
| 3,520,476 | 7/1970 | Schmid | 200/61.04 |
| 3,564,526 | 2/1971 | Butts | 200/61.04 |
| 3,578,767 | 5/1971 | Lee | 200/61.04 |
| 3,970,863 | 7/1976 | Kishikawa et al. | 307/116 |
| 4,013,924 | 3/1977 | Christensen et al. | 200/61.05 |
| 4,023,412 | 5/1977 | Luke et al. | 73/40.5 R |
| 4,125,822 | 11/1978 | Perren et al. | 338/34 |
| 4,193,068 | 3/1980 | Ziccardi | 200/61.04 |
| 4,206,632 | 6/1980 | Suzuki | 73/40.5 R |
| 4,246,575 | 1/1981 | Purtell et al. | 340/604 |
| 4,374,379 | 2/1983 | Dennison, Jr. | 200/61.05 |
| 4,414,441 | 11/1983 | Perry et al. | 200/61.04 |
| 4,445,012 | 4/1984 | Blackburn et al. | 200/61.04 |
| 4,449,098 | 5/1984 | Nakamura et al. | 138/104 |
| 4,563,674 | 1/1986 | Kobayashi | 340/605 |
| 4,570,477 | 2/1986 | Sugibuchi | 73/40.5 R |
| 4,631,952 | 12/1986 | Donaghey | 338/34 |
| 4,926,165 | 5/1990 | Lahlouh et al. | 73/40 |

FOREIGN PATENT DOCUMENTS

| | | |
|---|---|---|
| 719311 | 10/1965 | Canada . |
| 978614 | 11/1975 | Canada ............... 200/61.04 |
| 67679 | 12/1982 | European Pat. Off. . |
| 684427 | 11/1939 | Fed. Rep. of Germany . |
| 1210057 | 2/1966 | Fed. Rep. of Germany . |
| 1811704 | 7/1970 | Fed. Rep. of Germany ... 200/61.04 |
| 3441924 | 5/1985 | Fed. Rep. of Germany . |
| 591822 | 8/1947 | United Kingdom . |
| 939049 | 10/1963 | United Kingdom . |
| 1355176 | 6/1974 | United Kingdom . |
| 1470503 | 4/1977 | United Kingdom . |

Primary Examiner—Hezron E. Williams
Assistant Examiner—Craig Miller
Attorney, Agent, or Firm—Herbert G. Burkard; Timothy H. P. Richardson

[57] ABSTRACT

Devices for detecting and obtaining information about an event, for example the presence of a liquid, which comprise (1) a swellable member which swells upon occurrence of the event and (2) a restraining member which, when the swellable member swells, restricts movement of the swellable member and thus causes the impedance of the device to change. In a preferred embodiment the device comprises two elongate conductors helically wrapped around a support core, a swellable, conductive polymer member surrounding the conductors. Occurrence of an event causes the swellable material to swell and form a conductive bridge between the conductors.

17 Claims, 4 Drawing Sheets

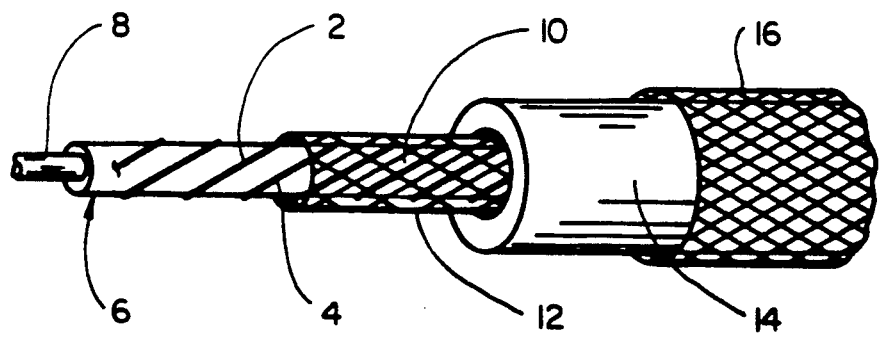
FIG_1
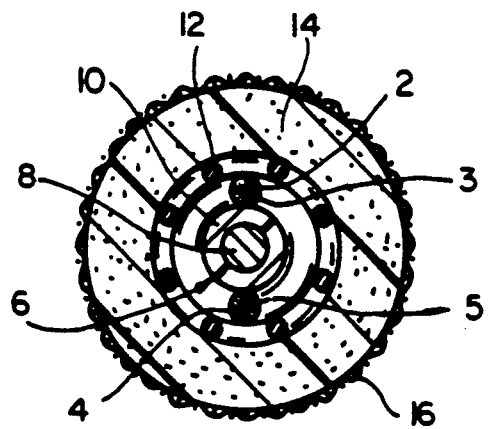
FIG_2A
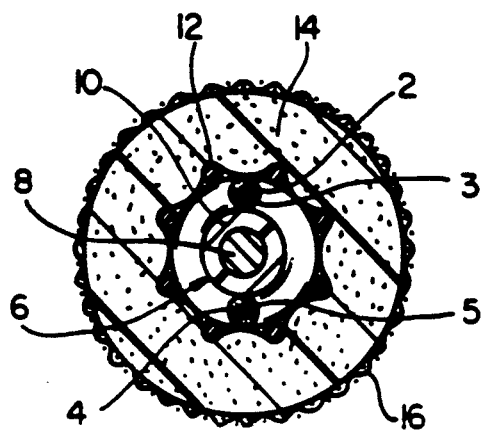
FIG_2B

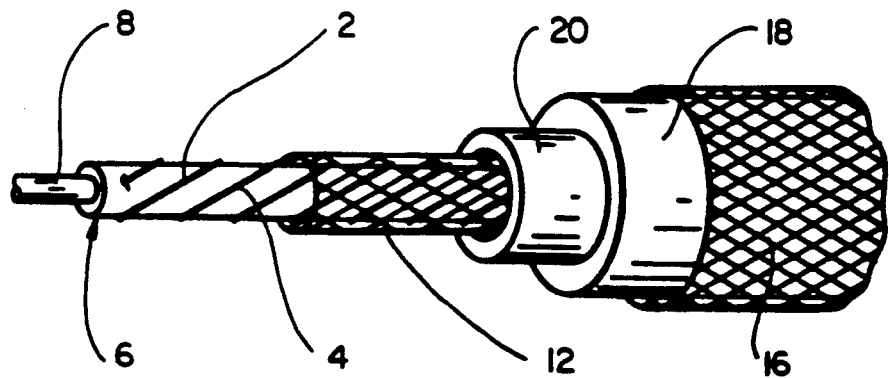
FIG_3
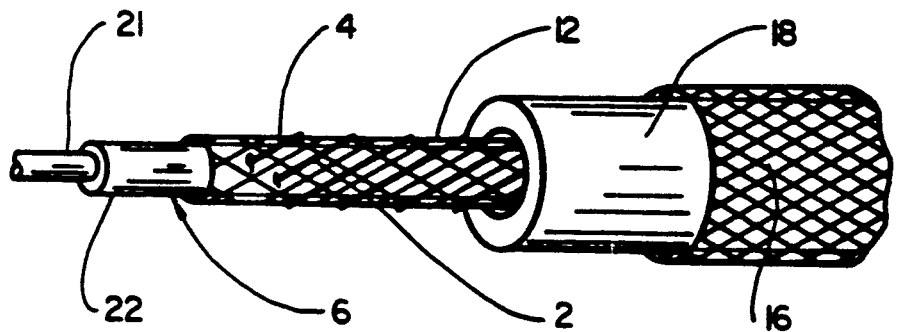
FIG_4
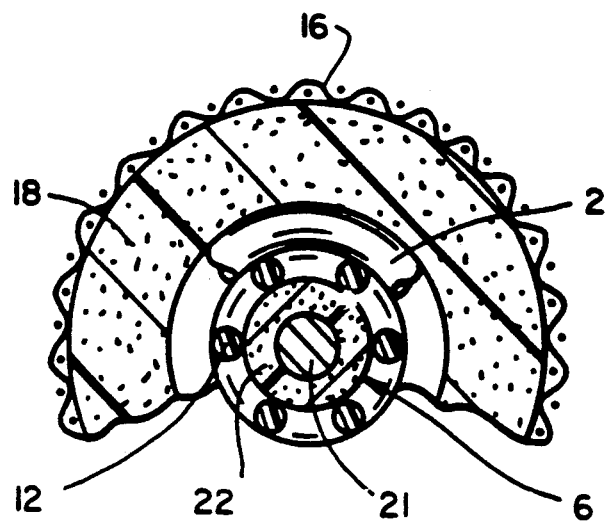
FIG_5A

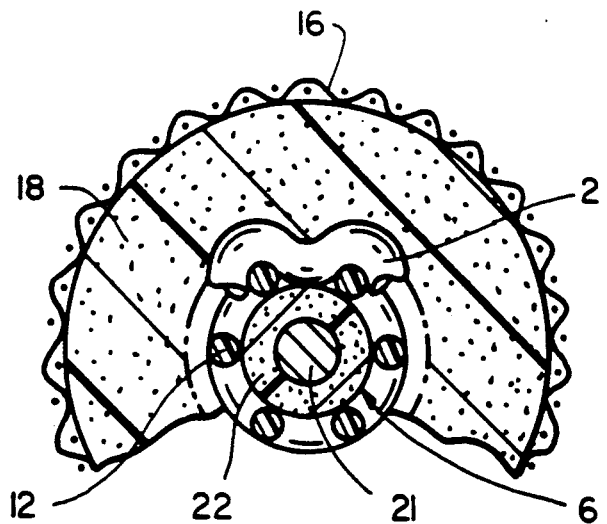
FIG_5B
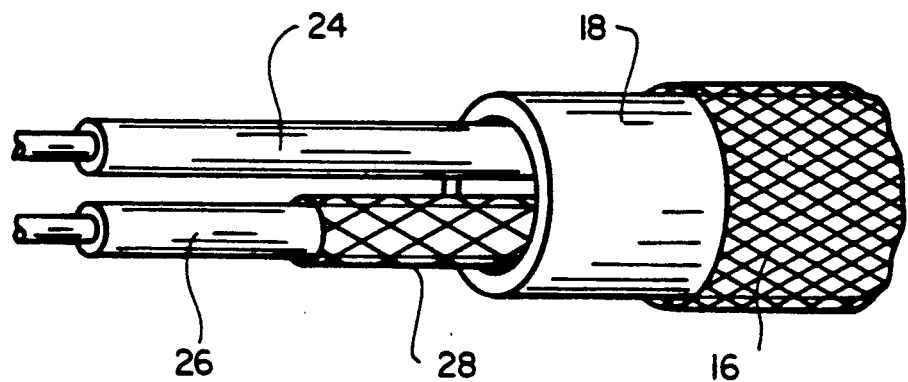
FIG_6
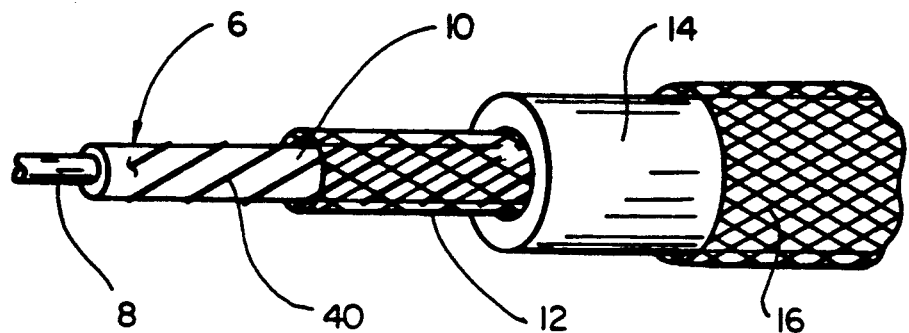
FIG_7

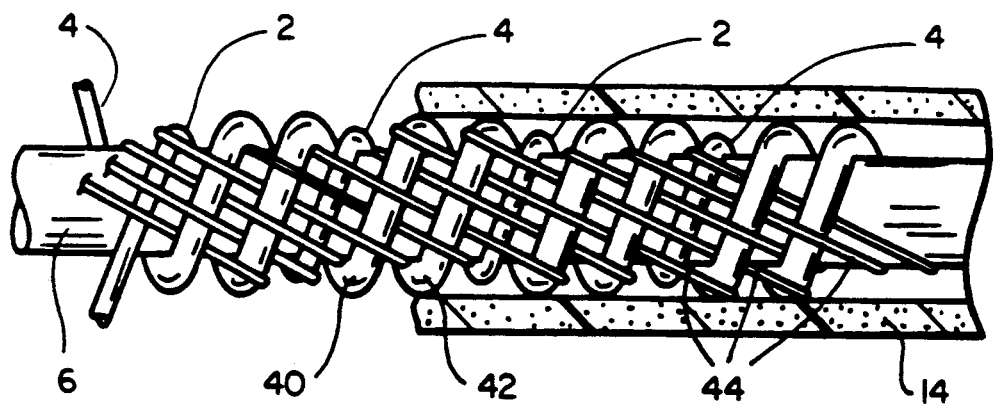
FIG_8
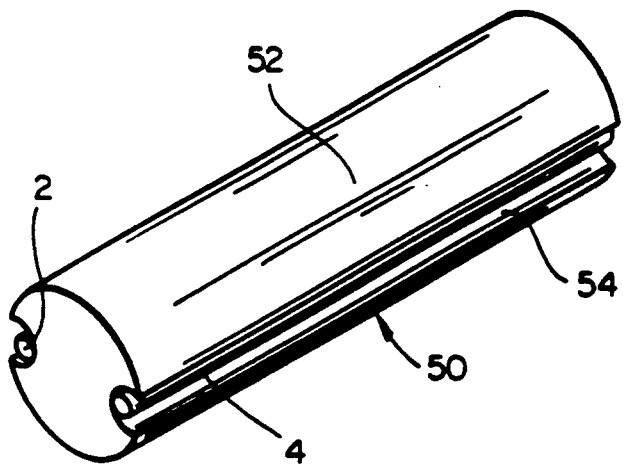
FIG_9
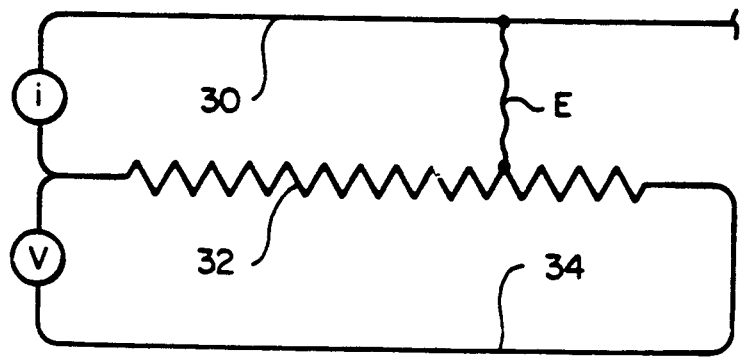
FIG_10

SENSORS FOR DETECTING AND LOCATING FLUIDS

This application is a continuation of copending commonly assigned Application Ser. No. 06/838,725 filed Mar. 11, 1986, now U.S. Pat. No. 4,926,165 which is a continuation-in-part of copending, commonly assigned Application Ser. No. 787,278 filed Oct. 15, 1985 now abandoned, which is itself a continuation-in-part of copending, commonly assigned Application Ser. No. 744,170 filed June 12, 1985, now abandoned; the disclosure of each of those applications is incorporated herein by reference.

BACKGROUND OF THE INVENTION

1. Field of the Invention

The invention relates to devices for detecting and obtaining information about an event.

2. Introduction to the Invention

A number of methods have been used (or proposed for use) to detect changes in variables, e.g. the presence of a liquid, the attainment of a predetermined temperature or pressure, the presence or absence of light or another form of electromagnetic radiation, or a change in the physical position of a movable member, e.g. a valve in a chemical process plant or a window in a building fitted with a burglar alarm system. Changes of this kind are referred to in this specification by the generic, term "event". Such detection methods are for example highly desirable to detect leaks from pipe lines, for example pipe lines carrying hydrocarbon liquids, leaks from steam lines into thermal insulation surrounding such lines, and leaks from tanks and pipes containing corrosive or noxious chemicals. U.S. Pat. No. 3,470,340 (Hakka) and U.K. Patent 1,355,176 (Nils Ostobo AB), for example, disclose devices for detecting the leakage of oil from oil pipelines. Each device comprises a material which swells when exposed to the leaking oil causing two metal contacts to touch and thereby trigger an alarm.

SUMMARY OF THE INVENTION

This invention relates to novel devices which are suitable for use in detecting an event and which comprise (1) a swellable member which swells upon occurrence of an event and (2) a restraining member which, when the swellable member swells upon occurrence of the event, substantially restricts movement of the swellable (now swollen) member in one direction so that movement of the swellable member in another direction causes the electrical impedance of the device to change. In most cases, the swelling of the swellable member will cause a decrease in impedance, and preferably will make an electrical connection which reduces the impedance of the device from infinity to some low value, which may be substantially zero. The swellable member can itself be conductive, or it can be an insulator and the swelling thereof can create, or break, or change, an electrical connection between two conductive members. The invention is particularly useful for the detection of fluids, i.e. gases and liquids, especially organic liquids, e.g. hydrocarbons, which are absorbed by, or undergo some other physical and/or chemical reaction with the swellable member and cause it to swell; preferably the swelling is reversible. For this purpose, the restraining member preferably comprises apertures which provide a path, preferably the sole path, for the fluid to contact the swellable member.

In a first aspect of the invention, the device comprises, in addition to the swellable member and the restraining member, first and second conductive members which, in the absence of an event, are electrically insulated from each other, and a separator which has apertures passing therethrough; and the swellable member, when it swells upon occurrence of the event, causes an electrical path to be formed between the conductive members, through the apertures of the separator.

In a second aspect of the invention, the device comprises, in addition to the swellable member and the restraining member, first and second conductive members which, in the absence of an event, are electrically insulated from each other; and at least a part of the swellable member is conductive and makes an electrical connection between the first and second conductive members whose impedance changes upon occurrence of an event. The swellable member can comprise one part which is both swellable and conductive, or it can comprise a first part which is conductive but not necessarily swellable and a second part which is swellable but not necessarily conductive. The electrical connection between the first and second conductive members can be of infinite or finite (including substantially zero) impedance in the absence of the event, and can be changed to a finite (including substantially zero) or infinite impedance by occurrence of the event.

In a third aspect, the present invention provides an apparatus for determining the presence and the location of an event comprising a device according to the first or second aspect of the present invention in which the first and second conductive members are elongate, and form part of an electrical circuit which measure the position along at least one of the conductive members at which the electrical path between them is formed.

In a fourth aspect of the invention, the device comprises a support, which is preferably of uniform cross-section along its length; a first conductive member which is wrapped around the support; an insulating spacer member which is wrapped around the support and projects outwardly from the support a greater distance than the conductive member; a second conductive member which is hollow and surrounds the support, spacer and first conductive member and is spaced apart from the first conductive member in the absence of an event; a swellable member which is also the second conductive member or which surrounds the conductive member; and a restraining member which surrounds the swellable member.

Particularly useful materials for the conductive parts of the devices of the invention include conductive polymers (i.e. polymeric materials which contain a sufficient amount of a particulate conductive filler to render them conductive). In a fifth aspect of the invention, the device comprises, in addition to a conductive swellable member and the restraining member, another conductive member to which the swellable member becomes electrically connected on occurrence of an event, and at least one of the swellable member and the other conductive member comprises a conductive polymer. In a sixth aspect of the invention, the device comprises, in addition to the swellable member and the restraining member, first and second conductive members which become electrically connected to each other on occurrence of an event, and at least one of the first and second members and the swellable member comprises a conductive polymer.

In a seventh aspect of the invention, the device comprises an apertured restraining member which comprises a plurality of filamentous members which define a plurality of apertures through which a fluid to be detected must pass in order to contact the swellable member. The filamentous members are preferably interlaced, particularly braided, around the swellable member. The size and frequency of the apertures in such a restraining member have a substantial effect on the operating characteristics of the device, and it is preferred that the ratio of the total area of the surface of the swellable member which is contacted by the filamentous members to the area of said surface which is not covered by the filamentous members, i.e. the area of the surface which is exposed to the eye when the surface is viewed at right angles, is at least 1.5, more preferably at least 2,5, particularly at least 5.0, especially at least 6.0.

When an apertured restraining member is used, as is preferred, the chemical nature of the exposed surfaces of the restraining member can have an important effect on the way in which the device behaves when exposed not only to the fluid(s) to be detected but also to other fluids which do not swell the swellable member. Thus, if such other fluid(s) prevent or retard access of the fluid to be detected to the swellable member, the device will not behave in the desired way. For example, it has been found that if the restraining member is a glass fiber braid which substantially covers the swellable member, the device works well for detecting the presence of hydrocarbons in a dry environment, but that if the device is exposed to water before hydrocarbons are present, its response time to the presence of hydrocarbons is greatly increased, apparently because water is retained in the apertures of the hydrophilic glass braid and prevents access of the hydrocarbon(s) to the swellable member. Accordingly, an eighth aspect of the invention provides a method of monitoring a locus for the presence of a first fluid having a first surface tension in the presence of a second fluid having a second surface tension which is lower than the first surface tension, which process comprises placing in the locus a device which comprises (1) a swellable member which swells in the presence of the first fluid but not in the presence of the second fluid, and (2) an apertured restraining member which (i) comprises a plurality of apertures through which the first fluid must pass in order to contact the swellable member, at least the surface of those parts of the restraining member which define the apertures being composed of a material having a free energy which is less than the second surface tension; and (ii) which, when the swellable member swells in the presence of the first fluid, substantially restricts movement of the swellable member in one direction so that movement of the swellable member in another direction causes the electrical impedance of the device to change.

The term "surface tension" is used herein to denote the specific free surface energy of a liquid, and the term "free energy" is used herein to denote the specific free surface energy of a solid.

In a ninth aspect of the invention, the apertures of the restraining member are defined by (i.e. the restraining member is composed of or is coated with) a material having a surface energy of less than $65 \times 10^{-3}$ joules/meter$^2$, so that the presence of water (whose surface tension is about $73 \times 10^{-3}$ joules/meter$^2$) has at most a limited effect on the response time to hydrocarbons or other fluids which swell the swellable member.

When the apertures of the restraining member are defined by a material having a surface energy of at least $65 \times 10^{-3}$ joules/meter$^2$, e.g. glass or metal fibers, the effect of water in retarding acess to the swellable member can be offset by increasing the size of the apertures in the restraining member. On the other hand, the apertures must not be made too big (whatever the free energy of the material) or the swellable member will swell through the apertures. Thus when the restraining member is composed of a material whose free energy is at least $65 \times 10^{-3}$ joules/meter$^2$ (i.e. is comparable to or greater than the surface tension of water), the ratio of the total area of the surface of the swellable member which is contacted by the restraining member to the area of the swellable member which is not covered by the restraining member is preferably at most 5.0, particularly 1.5 to 5.0.

Particularly suitable materials for the restraining member are organic polymers, for example polymers comprising units derived from at least one olefincally unsaturated monomer, e.g. polymers of one or more olefins, e.g. polyethylene, polymers of one or more substituted olefins, e.g. wholly or partially halogenated olefins, e.g. poly(vinyl chloride) and poly(tetrafluoroethylene) copolymers of one or more olefins and one or more substituted olefins; polyesters; polyamides; and others. The free energy of such polymers is preferably less than $40 \times 10^{-3}$ joules/meter$^2$, particularly less than $35 \times 10^{-3}$ joules/meter$^2$. Examples of suitable polymers include poly(trifluorochloroethylene), poly(tetrafluoroethylene), poly(hexafluoropropylene), poly(trifluoroethylene), which have free energies of $31 \times 10^{-3}$, $19 \times 10^{-3}$, $17 \times 10^{-3}$ and $22 \times 10^{-3}$ joules/meter$^2$, respectively, as well as other fluoropolymers.

The restraining member preferably comprises a plurality of filamentous members which, especially when they are composed of (or have a surface coating of) a material of relatively high surface energy, e.g. above 65 joules/meter$^2$, are preferably in the form of mono filaments so as to reduce wicking of water (or other contaminants) along the restraining member, as is liable to occur with multifilaments. The filamentous members are preferably in overlapping, particularly interlacing, relationship, for example in the form of a woven, knitted or braided fabric, especially in the form of a braid around the swellable member. We have obtained excellent results with a braided restraining member made from mono filaments having a diameter in the range of 5 to 12 mils e.g. about 10 mils.

The choice of material for the swellable member can have an important effect on the operating characteristics of the device, particularly its response time, which is ¬enerally desired to be short and to remain constant. It has been found that, when using the unsaturated elastomers previously recommended for swelling in the presence of organic solvents, the response time increases substantially with time, especially at elevated temperatures, apparently due to hardening of the polymer. We have obtained improved results through the use of a swellable member which is composed of a substantially saturated elastomeric composition. A particularly preferred saturated elastomer is a saturated acrylic elastomer (this term being used to denote an elastomeric copolymer comprising units derived from at least one acrylic ester and at least one olefin). A preferred acrylic elastomer is polybutyl acrylate; others are polyethylacrylate and ethylene/acrylate copolymers, e.g. the product sold by du Pont under the trade name Vamac. Such acrylic elastomers have been found to give particularly good results in the detection of organic solvents in general, especially common organic solvents such as methylethyl ketone, trichloroethylene, acetone and butyl acetate. Another very useful class of saturated elastomers comprises the ethylene propylene rubbers lene, which have been found to give particularly good results in the detection of hydrocarbons, e.g. fuels such as kerosene, gasoline, heptane and aviation fuel. Such ethylene-propylene rubbers usually contain less than 60% of ethylene. The term ethylene propylene rubber is used to include such rubbers which include residues of diene modifiers. Other saturated elastomers include silicone rubbers, chlorinated and chlorsulphonated polyethylenes, fluorocarbon rubbers, urethane rubbers, and vinyl acetate/ethylene copolymers with high vinyl acetate content. It is often advantageous to crosslink the swellable member in order to increase its modulus, and in another aspect the invention provides devices in which the swellable member is composed of a substantially saturated elastomeric material comprising a substantially saturated, cross-linked amorphous polymeric component.

Especially when the swellable member is composed of a conductive polymer, it has been found to be advantageous to include a crystalline polymeric component, preferably a substantially saturated crystalline polymeric component with the amorphous component. The crystalline component can be a separate polymer, preferably one which is compatible with the amorphous polymer (e.g. an ethylene/ethyl acrylate copolymer with an acrylic elastomer, or a crystalline ethylene/propylene copolymer, usually containing at least 60% of ethylene, with an ethylene/propylene rubber), or it can be combined with the elastomeric component in a single polymer, e.g. in a thermoplastic elastomer. The amount of the crystalline component is generally 5 to 50%, preferably 10 to 30%, by weight of the polymeric component. Advantages of incorporating a crystalline polymer include:

(1) when a conductive filler, e.g. carbon black, is present, the amount needed to produce a desired conductivity is reduced, and the filler is more easily incorporated;
(2) reduced melt viscosity leading to improved processing characteristics;
(3) the formulation is stiffer and harder, and the device is therefore less likely to be accidentially triggered by external pressure; and
(4) by varying the amount of crystalline polymer, the swelling behavior of the blend can be changed in a predictable fashion.

The crystalline polymer is preferably one which swells in the presence of the fluid to be detected; the degree of such swelling, however, will be much less than that of the elastomeric component.

Although various aspects, embodiments and features of the invention have been set out separately above and will be further described below, it will be realized that the invention includes, to the extent appropriate, the various possible combinations and sub combinations of those aspects, embodiments and features.

BRIEF DESCRIPTION OF THE DRAWINGS

The invention is illustrated in the accompanying drawings, in which:

FIG. 1 is a perspective view partly cut away, of a first device according to the invention, FIGS. 2a and 2b are cross-sectional views through the device of FIG. 1, before and after swelling of the swellable member, respectively, FIG. 3 is a perspective view, partly cut away, of a second device according to the invention, FIG. 4 is a perspective view, partly cut away, of a third device according to the invention, FIGS. 5a and 5b are cross-sectional views through the device of FIG. 4, before and after swelling of the swellable member, respectively, FIG. 6 is a perspective view of a fourth device according to the invention, FIG. 7 is a perspective view, partly cut away, of a fifth device according to the invention, FIG. 8 is a perspective view, partly cut away, of a sixth device according to the invention, and FIG. 9 is a perspective view of part of a seventh device according to the invention, and FIG. 10 is a schematic circuit diagram, of an electrical circuit incorporating a device according to the invention.

DETAILED DESCRIPTION OF THE INVENTION

Devices according to the first aspect of the present invention comprise first and second conductive members, separator and a swellable member. Preferably the swellable member is a conductive material, especially a conductive polymeric material. The swellable member may be the same member as one of the first and second conductive members, or a separate member. If it is a separate member, it may itself be conductive.

Devices according to the second aspect of the invention which comprise first and second conductive members and a swellable conductive member may or may not include a separator, apertured or otherwise. Before swelling of the conductive swellable member, the conductive member (that is the first and second members and the swellable member) are insulated from each other, to the extent that there is no electrical path between the first and second conductive members. This may be achieved simply by providing an air gap between the conductive members, or in any other way. Preferably however, the devices according to the second aspect of the invention do include an apertured separator. That separator is preferably positioned to separate the swellable member from the first and second conductive members.

Devices according to the fourth aspect of the invention comprise first and second conductive members, a swellable member, and spacer member. The swellable member may be the same member as the second hollow conductive member, or a separate member. If it is a separate member it may itself be conductive. The second conductive member may act as a conductive bridging member to bridge the first conductive member to a further conductive member to form an electrical path between the first and further conductive members. That further conductive member is preferably in the form of an elongate member helically wrapped around the inner support core.

A number of preferred features of devices according to the fourth aspect of the present invention are now discussed. The spacer member is preferably insulating, at least in part. Preferably at least those parts of the spacer member that are in contact with the first and second conductive member, in use, are insulating. Especially preferably the entire spacer member is insulating. Preferably the first conductive member is in the form of an elongate member, helically wrapped around, and in contact with the with the support core. The second conductive member is act preferably in the form of a cylinder surrounding the inner support core and wrapped first conductive member. Preferably the spacer member also comprises an elongate member or members, for example a tubular member or members. The term "tubular" is used to include members having a closed cross-section and also members having an open cross-section. The spacer member and first conductive member preferably have a circular cross-section. In this case the spacer member preferably has a larger diameter than that of the first conductive member. Preferably the elongate spacer and conductive members are helically wrapped around the inner support core. Preferably the elongate spacer and conductive members are helically wrapped parallel to each other. Preferably one or more elongate spacer members are wrapped between each conductive member, preferably in a uniform arrangement. In a particularly preferred device the device additionally comprises an insulating filler member or members. Preferably the filler members are elongate, and the conductive, spacer and filler elongate members are braided together around the inner support core. Preferably the filler members are circular in cross-section and have a diameter smaller than the diameter of the elongate spacer members, especially preferably smaller than the diameter of both the spacer and the conductive elongate members. Preferably the braiding is carried out so that the filler member or members does not pass between the conductive member and the inner support core. This means that the conductive wire is always in contact with the inner support core. The inner support core is preferably cylindrical.

In the devices according to the fourth aspect of the invention, the spacer spaces the first and second conductive members. As described above; in one preferred embodiment the spacer member and the first conductive member are elongate members wrapped around an inner support core, and the second conductive member is a hollow tubular member positioned therearound. In this preferred embodiment the inner surface of the conductive member is in contact with the spacer member and is therefore spaced from the inner wrapped first conductive elongate member by the larger spacer member. The separation between the first and second conductive members corresponds to the difference in the diameters of the wrapped spacer member and the wrapped, smaller conductive member (for members of circular cross-section). In a particularly preferred embodiment, described above, elongate filler members are also included, braided with the other elongate members. The filler members pass between the elongate spacer members and the inner support core, at least at some points. Thus the maximum separation of the conductive members corresponds to the difference between (1) the sum of the diameters of the filler and spacer members, and (2) the diameter of the wrapped conductive member.

The minimum separation between the first and second conductive members corresponds to the difference in the diameters of the elongate spacer member and the wrapped conductive member. Preferably the elongate filler members have a small diameter relative to the other members so that the difference is the maximum and minimum separation of the conductive members is small. Typical size ranges for the wires of devices according to the fourth aspect of the invention are as follows:

|   | Preferred Diameter Range in Mil | |
|---|---|---|
| 1 Inner support core | 73 to 83 | esp 78 |
| 2 Wrapped conductive member (wire) | 27 to 37 | esp 32 |
| 3 Wrapped spacer wire (larger than wire (2)) | 30 to 55 | esp 35 |
| 4 Wrapped filler wire | 5 to 15 | esp 10 |

With devices according to the fourth aspect of the invention the minimum separation of the conductive members is advantageously determined by the spacer. A large minimum separation is desirable to avoid accidental contact of the conductive members. If the separation is small, such accidental contact might be caused, for example, by an external pressure on the device. A small minimum separation is desirable in applications where rapid contact between the conductive members is desired in response to swelling of the swellable member. For a rapid response the minimum separation of the conductive members is preferably less than 10 mils, more preferably less than 5 mils, especially preferably less than 3 mils. Thus the relative sizes of the wires of the device are chosen according to the application.

Where the spacer comprises a helically wrapped elongate member it may be considered to be an apertured separator.

A number of preferred features are now discussed. Unless otherwise specified, these are applicable to devices according to all aspects of the present invention.

In one preferred device a separator is provided, positioned to separate the swellable member from the first and second conductive members, which are themselves electrically separated from each other. The swellable member comprises a conductive material, preferably a conductive polymer, which swells through the apertures of the separator into contact with both the first and the second conductive members; to bridge the conductive members, thereby providing an electrical path, therebetween.

In another preferred device, an additional member, a conductive bridging member, is provided. The apertured separator is positioned to separate the conductive bridging member from the first and second conductive members, which are themselves electrically separated from each other. Swelling of the swellable member urges the third conductive member through the apertured separator into electrical contact with the first and second conductive members, bridging the members and forming an electrical path therebetween. The conductive bridging member may be positioned between the swellable member and the first and second conductive members, in which case the members may be arranged in the following sequential order: first and second conductive members, apertured separator, bridging member, swellable member. Alternatively, the conductive bridging member may be arranged on the same side of the swellable member and the first and second conductive members, in which case the members may be arranged in the following sequential order: bridging member, separator, first and second conductive members, swellable member.

In a further preferred device in which a separator is provided, the separator separates the first and second conductive members from each other, and swelling of the swellable members urges the conductors into contact with each other, through the pertured member to provide the electrical path therebetween. In such devices there is direct contact between the first and second conductors and no additional bridging conductive member is required.

In a further preferred device according to the invention the swellable member is conductive and is the same member as one of the first and second conductive members. In the device, the separator is preferably positioned to separate the conductive swellable member from the other of the first and second conductive members. The swellable member, which preferably comprises a conductive polymer material, swells upon occurrence of an event through the apertures of the separator into contact with the other of the first and second conductive members, whereby an electrical path is formed between the swellable conductive member and the other of the first and second conductive members.

In devices according to the invention which include an apertured separator, a member (which may be the swellable member itself, a conductive bridging member, or one of the first and second conductive members depending on the embodiment of device chosen), is urged through the apertured separator on swelling of the swellable member. In order that the member can pass through the separator it must have a sufficiently low modulus of elasticity. Preferably the member has a modulus of elasticity in the range $5 \times 10^5$ to $5 \times 10^{10}$ dynes/cm$^2$, particularly in the range $1 \times 10^8$ to $5 \times 10^9$ dynes/cm$^2$, measured at 29° C. at a frequency of 1 Radian per second.

The first and second conductive members are preferably elongate. The members may be arranged, for example, substantially parallel to each other in a substantially straight line, or may be helically wrapped around a central elongate support core, the members providing alternate turns of the helix. In each case the conductive members are preferably spaced from each other substantially uniformly along their length. Preferably the elongate conductive members are used in combination with a swellable member which extends along the length of the conductive members, or along the length of the support core in the case of helically wrapped conductive members. Such an arrangement has the advantage that swelling of the swellable member at any point along its length can result in an electrical path being formed between the first and second conductive members. Thus the device can be used for detection of an event along a continuous path. Preferably the devices are provided in "effective lengths", that is in lengths that can be used to detect an event at any point therealong, of at least 1 foot, particularly at least 50 feet, especially at least 1,000 feet, more especially at least 3,000 feet.

In devices according to the invention a number of the members may comprise conductive materials. The swellable material may be conductive, a conductive bridging member may be incorporated, and the first and second conductive members are conductive. Any suitable conductive material may be used for these members. Preferably, at least the swellable material (where it is conductive) or the bridging member (where it is present) comprise a conductive polymer. A conductive polymer is a mixture of a conductive filler and an organic polymer (this term being used to include polysiloxanes), the filler being dispersed in, or otherwise held together by, the organic polymer. Any suitable conductive filler may be used, for example, carbon black, graphite, or metal particles or a mixture thereof. Conductive polymer compositions are in principle well known and conductive polymer compositions which have been found to be particularly suitable for use in this invention are described below.

Where the swellable material is itself conductive, and swells to form a bridge between the first and second conductive members, it is preferably selected from a material and/or the device is preferably so arranged, that the conductive material remains conductive in its swollen state. When a conductive polymer swells, the conductive particles therein become further separated and thus the resistivity of the polymer increases. Hence where a conductive polymer is used, the conductive particle loading is preferably carefully controlled to achieve the desired conductivity after swelling. This may be achieved by appropriate selection of the conductive filler and/or appropriate selection of the percentage of filler used. In addition the device is preferably arranged such that the maximum total volume into which the material can swell is controlled. Thus the device is preferably arranged such that there is a restraint on the swelling. This enables conductive polymeric materials to be used which, if allowed to swell freely would become non conductive. The resistivity of the conductive polymer before swelling is preferably in the range 0.1 to 20,000 ohm.cm, particularly 1 to 1,000 ohm.cm, especially 1 to 250 ohm.cm. The resistivity after swelling is preferably in the range 0.2 to 40,000 ohm.cm, particularly 2 to 2,000 ohm.cm, especially 2 to 500 ohm.cm.

Addition of a conductive filler to a polymer typically increases the modulus of elasticity of the polymer. Thus where a swellable conductive polymer is to be used in combination with an apertured separator and on swelling of the swellable member is urged through that separator, this must be taken into account. In order to have both a preferred resistivity and a preferred modulus of elasticity the conductive polymer preferably contains from 5 to 35 volume % of a conductive filler, for example carbon black.

Any suitable material may be used for the swellable member. Preferably a polymeric material is used. As examples of materials that may be used there may be mentioned styrene-butadiene-styrene block copolymers, styrenebutadiene elastomers, natural rubber, isoprene rubber and nitrile rubber. The selection of the swellable material depends on the event to be detected. Thus where the device is to be used to detect the presence of a particular fluid, for example a particular liquid, a material must be selected which will swell in that liquid, but not in any other liquid which might also be present. The physics of liquid/polymer swelling interaction, and of the swelling of polymers subjected to other events are well known, and those skilled in the art will have no difficulty, having regard to their own knowledge and the disclosure herein, in selecting an appropriate material for detection of a wide range of events.

Where a polymeric material is used for the swellable material it may be an amorphous or crystalline polymeric material or a mixture of amorphous and crystalline polymer materials. Preferably the polymeric material is lightly cross-linked. Cross-linking may be effected, for example by irradation, for example by a beam of high energy electrons or gamma rays, or by the use of chemical cross-linking agents. Where the polymer is cross-linked by irradiation, it is preferably irradiated to a beam dose of 2 to 30 Mrads, most preferably about 10 Mrads. The polymer may be irradiated to the same beam dose throughout its thickness, or to a greater beam dose at its surface portions that at the intermediate portions, or in any other way. Cross-linking of the polymeric material is particularly preferred when the polymeric material used is totally amorphous.

The separator may be in any suitable form. The event is most rapidly detected where there is an aperture at the location of the event and hence at the point of swelling. The apertures may be spaced uniformly along the device, randomly, or only at predetermined locations. The apertures may be any suitable shape. In one embodiment, the apertures are rectilinear, preferably square or diamond shaped, as for example where the separator comprises a braid. In another embodiment the apertures are slits. Thus for example the the separator may comprise a slit tape that is helically wrapped in the device, or a tape that is wrapped such that there are spaces between adjacent windings. In another embodiment the apertures may be circular. For example, the separator may comprise a tube or wrapped tape, containing circular apertures. The smallest dimension of the apertures is preferably in the range 0.5 mm to 15 mm for example about 1.5 mm. The surface area of the aperture is preferably in the range 0.25 mm$^2$ to 225 mm$^2$, for example about 2.25 mm$^2$. The depth of the apertures is preferably in the range 0.1 mm to 5 mm.

The apertured separator may comprise an inner support core comprising depressions into which one of the conductive members is fitted. For example the apertured separator may comprise an insulating cylindrical core comprising one or more channels extending along its length. An elongate conductive member is preferably positioned in the or each channel. A second tubular conductive member is preferably positioned around the cylindrical core, which upon occurence of the event contacts the or each elongate conductive member contained in the or each channel. The outer tubular conductive member may simply contact one elongate conductive member to signal an event, or may bridge two conductive members contained in channels to signal the event. The depth of the channels in the cylindrical core is preferably greater than the diameter of the elongate conductive members contained in the channels so that, in the absence of an event, the core spaces the elongate conductive member from the surrounding tubular member. If desired an additional separator, for example a braid may be included between the conductive members.

The apertured separator may be compressible, such that on swelling of the sellable member it is compressed. For example, the apertured separator may comprise a foam.

Where a conductive bridge forms the electrical path between the first and second conductive members (either directly by a swellable conductive material, or by the action of a swellable, non-conductive material on a nonswellable conducive bridging member, the separation of the conductive bridging member (which may be the swellable member) and the first and second conductive members is preferably in the range 0.001 to 0.05 inch, preferably about 0.01 inch. If the distance is too small there is a risk that during manufacture of the device, some of the material of the conductive bridging member/swelling member may pass through the apertured separator and form a bridge between the first and second conductor before swelling has taken place. If the separation is too great, swelling of the swellable member may not be sufficient to urge the conductive bridging member (or itself, where the swellable member itself provides the conductive bridge) through the apertured separator.

In one preferred embodiment the swellable member is tubular and positioned to surround the apertured separator and the first and second conductive members. Preferably the hollow swellable member is positioned within a restraining member, such that it swells predominantly toward the apertured separator and first and second conductive members away from the restraining member. The restraining member is preferably also hollow. The restraining member is preferably selected to readily allow the event to be detected to reach the swellable member. In another preferred embodiment the swellable member comprises one or more elongate rods. The rod or rods are preferably positioned adjacent the apertured separator, within a restaining member. In another embodiment the swellable member comprises one or more helically wrapped swellable members, positioned adjacent the apertured separator within a restraining member. In each case the restraining member is preferably hollow.

Where the event to be detected is a fluid, for example, a liquid, the restraining member is preferably permeable to that liquid, and especially preferably contains apertures to allow passage of the liquid through the restraining member. The restraining member may comprise, for example a braid, or another fabric construction, for example a weave or knit. Where the event to be detected comprises for example a change in temperature, the restraining member may or may not be permeable, but is preferably not thermally insulating. Where a braid or other fabric is used as the restraining member, the fabric is preferably not so open as to allow the swellable member to pass through it, but is not so closed and the consequent fabric tension so tight that a conductive path is formed between the first and second conductors, during application of the restraining member during manufacture of the device.

Devices according to the invention are preferably included in apparatus and used in methods in which the first and second conductive members form part of an electrical circuit which can measure the position along at least one of the conductive members, at which the electrical path between them is formed. Such an apparatus not only detects the presence of an external stimulus bt· also its location. Examples of such apparatus are disclosed in the following copending, commonly assigned, U.S. Patent Application Ser. Nos., the disclosure of which are incorporated herein by reference: U.S. Ser. Nos. 599,047, 599,048 556,740, 618,106, 618,109 603,485, 618,108, 603,484.

Preferred embodiments of apparatus and methods disclosed in the above mentioned U.S. patent applications comprise two conductors that follow an elongate path and are connected to each other at one end through a constant current source. In the absence of an event, the two conductors are electrically insulated from each other at all points along the path. Where an event occurs, the two conductors become electrically connected at a connection point at which the event occurs, thus completing a circuit in which a current of known size then flows. One of the conductors is a locating member having known inpedance characteristics along its length, and by measuring the voltage drop between the connection point and one end of the locating member the location of the event can be calculated. The other conductor constitutes a source wire to complete the test circuit in which the current of known size flows. A third conductive wire, a return conductor is preferably also provided to form a reference circuit from which the voltage drop between the connection point and one end of the locating member can be calculated. Where devices according to the present invention are included in such circuits and apparatus, the first and second conductive members preferably constitute the source and the locating members respectively. A return conductor is preferably also included. Where the first and second conductive members are included in a device in which they are elongate and helically wrapped around a central support core, the core may conveniently comprise an elongate return conductor insulated from the first and second conductive members.

A casing maybe provided around devices according to the invention to avoid accidental, external pressure-activated, contact of the conductive members. The casing preferably comprises a resilient or rigid material. For elongate devices, the casing may be, for example, in the form of a helically wrapped member. Where the event to be detected is a fluid, for example a liquid, the casing is preferably permeable to that fluid. The casing may, for exmaple, contain apertures or slits to allow passage of the fluid therethrough, or it may comprise a material permeable to that fluid.

A number of different types of events can be detected using different devices and apparatus according to the present invention. The event can be anything which results in swelling of the swellable member and the formation of an electrical path between the first and second conductive members. Examples of events that may be detected which may be mentioned are (1) the presence of fluids, for example the presence of liquids or gases, for example an organic liquid such as a hydrocarbon, (2) an increase or decrease in temperature above or below a particular value, (3) an increase or decrease in pressure above or below a particular value, or (4) any combination of the above.

Devices according to the invention may be reversible or irreversible. In reversible devices the swellable member is selected such that it returns towards its unswollen state when the event to be detected is removed.

Referring now to the drawings, FIG. 1 shows a device comprising two elongate conductors 2,4 that are helically wrapped around a central elongate support core 6. Each conductor 2,4 comprises a central wire 3 coated with a layer of a conductive polymer 5. Support core 6 comprises an inner stranded metal wire 8 having an insulating jacket 10. The conductors 2,4 and support core 6 are surrounded by a polyvinylidenefluoride fibre separator braid 12, which is in turn surrounded by a tubular conductive polymer swellable member 14 comprising a carbon black loaded styreneisoprene-styrene block copo-lymer. The swellable member 14 is in turn surrounded by a glass fibre restraining member 16. Swellable member 14 swells when exposed to hydrocarbon fluid.

FIGS. 2a and 2b show the device of FIG. 1 before and after swelling of member 14 respectively. As can be seen, before swelling, separator braid 12 prevents electrical contact between conductive members 1 and 2. After swelling (FIG. 2b) the swollen member 14' has urged through the separator braid 12 and contacted conductors 1 and 2. The swollen member 14' is conductive and therefore provides a conductive bridge between conductive members 1 and 2 and an electrical path therebetween. Restraining member 16 prevents the swellable member 14 swelling radially outwards.

FIG. 3 shows a similar device to that shown in FIGS. 1 and 2 in which the swellable conductive member 14 is replaced by a hollow swellable, non conductive member 18 and a hollow non-swellable conductive member 20. The swellable member 18 surrounds the conductive members 20, and on swelling urges the conductive member 20 through the separator braid 12. The hollow swellable member 18 may be replaced by a plurality, typically four, swellable, non-conductive, rods. The rods preferably extend along the device between the conductive member 20, and the restraining braid 16. Alternatively the hollow swellable member 18 may be replaced by one or more helically wrapped swellable members, helically wrapped around conductive member 20.

FIG. 4 shows a third device according to the invention. The device comprises a support core 6 which comprises an insulated stranded metal wire 21 having a conductive polymer jacket 22 over its insulation. The jacket 22 is surrounded by a braided separator 12, and conductors 2 and 4 are helically wrapped around the separator 12. A hollow, swellable, non conductive member 18 surrounds the braided separator, and a restraining member 16 surrounds the swellable member 18.

FIGS. 5a and 5b show the device of FIG. 4 before and after swelling member 18. Before swelling, braided separator 12 separates the conductors 2,4 from the conductive polymer member 22. After swelling they are urged into contact. Thus the inner conductive member 22 forms a conductive bridge between the conductors.

FIG. 6 shows a fourth device according to the invention. The device comprises two elongate conductors 24,26 which each comprise a conductive polymer jacketed wire. One of the wires 26 is surrounded by a separator braid 28. The conductors are arranged substantially parallel to each other and are separated from each other by braid 28. A hollow swellable non conductive member 18 surrounds conductor 24 and braid-covered conductor 26. A restraining braid 16 in turn surrounds member 18. Swelling of member 18 urges the conductive polymer jacketed wires 24 and 26 towards each other and urges their conductive polymer jackets through the braided separator 28 into contact with each other. Thus direct contact is made between the conductors 24 and 26.

FIG. 7 shows a fifth device according to the invention. The device comprises a support core 6 comprising a standed metal wire 8 coated with an insulating jacket 10. A single elongate conductor 40 is helically wrapped around the support core. The conductor 40 comprises a conductive polymer coated wire. The conductor 40 and support core 6 is surrounded by a nylon fibre separator braid 12 which is in turn surrounded by a tubular conductive polymer swellable member 14 comprising a carbon black loaded styrene-isoprenestyrene block copolymer. The swellable member 14 is in turn surrounded by a glass fibre restraining member 16. On occurrence of the event the conductive member 14 swells through the apertures of the braid 12 into contact with the conductor 40, whereby an electrical path is formed between the conductive swellable member and the conductor 40.

FIG. 8 is another device according to the invention. It comprises (1) two elongate conductors 2, 4 that are helically wrapped around a central elongate support core 6, (2) two insulating spacer wires 40, 42 helically wrapped around the support core 6, in the same sense as the conductors 2, 4 (3) four filler wires 44 helically wrapped around the support core in the opposite sense and (4) a tubular, swellable, conductive polymer member 14 surrounding the support core 6 and wrapped wires 2, 4, 40, 42 and 44. The spacer wires 40 have a larger diameter than conductive wires 2, 4. Thus they provide a distance separation between the conductive wires 2, 4 and the tubular conductive swellable member 14. When the swellable member is exposed to hydrocarbon, it swells, contacts and bridges the conductors 2, 4, forming an electrical path therebetween. The filler wires 44 are wound so that they pass over but not under conductive wires 2, 4. Thus they do not pass between the conductive wires 2, 4 and the support core 6. The filler wires 44 pass both over and under the spacer wires 40+42. Thus in the absence of an event the minimum and maximum separation between the conductive members 2, 4 and the bonding member 1A are given as follows:

Minimum Separation = Ds − Dc

Maximum Separation = Ds − (Dc + Df)

where
- Ds = Diameter spacer wire 40
- Dc = Diameter conductive wire 2, 4
- Df = Diameter filler wire 42.

FIG. 9 shows all apertured separator 50 which can be used in devices according to the invention. The separator comprises an insulating cylindrical core 52. The core contains two channels 54 extending along its length. Elongate conductive members 2, 4, having a circular cross-section, extend along the length of the core 52. The diameter of conductive members 2, 4 is smaller than the depth of channels 52. A tubular swellable conductive member (not shown) is positioned to surround the core 52. An occurence of an event it swells into channels 54 into contact with conductive members 2, 4.

FIG. 10 is a schematic drawing showing a circuit in which devices according to the invention may be incorporated. The circuit comprises a source wire 30, locating wire 32 and a return wire 34. Wires 30 and 32 are initially separated from each other but can be connected by an event E. When connection is made, a test circuit is formed comprising wires 30, 32 and the event E. A constant current is driven through that circuit. Locating wire 32 has a known impedance which is constant or varies in a known way along its length, and together with return wire 34 forms a reference circuit, in which a voltage measuring device is included. Provided the impedance values of all the elements in the reference circuit are known, and given the voltage measurement of the reference circuit and the known current flowing through the locating wire 32 it is possible to determine the position of event E.

Devices as shown in FIGS. 1 to 5 and FIGS. 8 and 9, for example, may be included in the circuit of FIG. 10. In that circuit conductors 2 and 4 provide the source and locating wires 30 and 32, and the central insulated wire 8 of support core 6 provides the return wire 34. Devices as shown in FIGS. 6 and 7, for example, may also be included in the circuit of FIG. 10. For the device of FIG. 6, the conductors 24 and 26 provide the source and locating wires 30 and 32. A return wire may be provided in any suitable way. For the device of FIG. 7, the conductive swellable member 14 and the conductor 40 provide the source and locating wires respectively, and central insulated wire 8 of the support wire 6 provides the return wire 34. The event E which causes connection of conductors is the swelling of the swellable member, which is in turn caused by an external event, in the present case the presence of a hydrocarbon liquid.

The invention is illustrated by the following Examples.

EXAMPLE 1

A device according to the invention was made in the following way.

Two conductive members, the first comprising a copper core surrounded by a conductive polymer jacket and the second comprising a "Copel" core surrounded by a conductive polymer jacket, together with insulating members were formed into a braid around an insulating jacket surrounding a third copper stranded wire. An insulating jacket comprising polyvinylidene-fluoride fibres was then braided thereover.

A swellable conductive polymer composition was compounded using a Banbury mixer. The composition had the following composition:

| KRATON 1107 | 58.0 weight % |
|---|---|
| CONDUCTEX 975 | 35.0 |
| SHELLFLEX 371 | 5.0 |
| TAIC | 1.0 |
| IRGANOX 1010 | 0.5 |
| AGERITE RESIN D | 0.5 |
| | 100.0 |

KRATON 1107 is a styrene-isoprene-styrene block copolymer manufactured by Shell Chem. Co. with a styrene/rubber ratio of 28/72.
CONDUCTEX 975 is a high surface area carbon black with high electrical conductivity manufactured by Cities Service Company, Columbian Division.
SHELLFLEX 371 is a naphthenic oil manufactured by Shell Oil and is used as a processing aid.
TAIC is triallylisocyanurate, which is a radiation crosslinking agent.
IRGANOX 1010 AGERITE RESIN D are antioxidants/antidegradants/heat stabilizers The swellable conductive composition was extruded over the braid-enclosed cables. The extrudate had a wall thickness in the range 50 to 60 mils, an external diameter of 0.25 inch and an internal diameter of 0.19 inch. The extruded material was beamed with a beam of high energy electrons to a dose of 10 Mrads throughout. Finally the swellable material was overbraided with a restraining braid comprising glass fibre, Fibreglass ECG 105-⅓, as supplied by Owens Corning. Sixteen yarns were used (eight in each direction) and each yarn consisted of 204 filaments with anominal filament diameter of 0.36 mil. the braid completely covered the swellable member. Glass has a free energy of $200 \times 10^{-3}$ to $300 \times 10^{-3}$ joules/meter$^2$.

The device was then connected into a circuit according to FIG. 10, the copel wire providing the locating wire, the wrapped copper wire the source wire, and the central copper wire the return wire. The device was immersed in a liquid and the resistance in the test circuit (including the locating and source wires and the event, when it occurs) monitored. Initially the resistance of the test circuit is infinite, since before an event occurs the circuit is open. The time for the resistance to fall to 20,000 ohm and further to 1,000 ohm was recorded, for a number of different liquids, in Table 1 below. Two tests were carried out for each solvent.

TABLE 1

| LIQUID | TIME TO 20,000Ω in minutes | TIME TO 1,000Ω in minutes |
|---|---|---|
| JP-7 (Jet Fuel) | 8 | 11¼ |
| JP-7 (Jet Fuel) | 11 | 16 |
| Xylene | 3¼ | 5¼ |
| Xylene | 2 | 4 |
| Methylethylketone | 7 | 15 |
| Methylethylketone | 8 | 19 |
| Methylene Chloride | 1 | 4¼ |
| Methylene Chloride | <¼ | 1 |
| Acetone | 61 | 114 |
| Acetone | 105 | 152 |
| Trichlorethylene | 1¼ | 3 |
| Trichlorethylene | <1 | <2 |
| Carbon Disulfide | ¼ | 1¼ |
| Carbon Disulfide | <¼ | ¼ |

EXAMPLE 2

Two devices as shown in FIG. 8 were made; these are referred to as Devices A and B. The outer braid was the same as in Example 1. The sizes of each of the components in devices A and B were as follows:

|  | Device A in Inch | Device B in inch |
|---|---|---|
| Diameter Support Core (6) | 0.077 | 0.060 |
| Diameter Spacer Wire (40, 42) | 0.035 | 0.049 |
| Diameter Conductor (2, 4) | 0.032 | 0.032 |
| Diameter Filler Wire (44) | 0.013 | 0.013 |
| Wall Thickness Conductive Polymer (14) | 0.050 | 0.050 |

The main difference between devices A and B is in the size of the spacer wires (40, 42). The devices were irradiated to a dosage of 5 Mrads after the swellable member has been applied and before the outer braid has been applied.

Both devices were exposed to solvent to make the swellable member swell and the time for the resistance fall to 20,000 ohm was recorded, as in Example 1. The load required to effect that resistance decrease was also noted. It is referred to as the load to trigger. The load to trigger was measured by compressing the devices using an Instron machine having a crosshead displacement rate of 0.05 inch per minute. The anvil used to compress the samples had a daimeter of 2.25 inches. The load to trigger was calculated per unit length of the device. Two readings were taken in each test.

|  | Device A | Device B |
|---|---|---|
| Product reponse time in minutes to reduce resistance to 20,000 ohmn | 5.0 5.0 | 31.5 34.0 |
| Load to trigger | 12.5 | 50.2 |

|  | Device A | Device B |
|---|---|---|
| in lbs. per linear inch | 15.4 | 43.5 |

For device A (where the spacer wires are at least 3 mils larger than the conductor wires) the response time is more rapid, but the load to trigger lower, than for device B (where the spacer wires are at least 17 mils larger than the conductor wires). Device A is particularly suited to applications where a rapid response time is required. Device B is particularly suited to applications where the device may be subject to external pressure, and accidental response needs to be avoided.

The load to trigger of device A was increased to over 30 pounds per linear inch by helically wrapping a resilient coil around the device.

EXAMPLE 3

A device was made in the same way as Device A of Example 2 except that the swellable composition was as shown in Table 2 below; the outer braid was made by braiding 16 poly(trifluorochloroethylene) ("Halar") monofilaments, each having a diameter of about 15 mils, instead of the glass fiber yarns. Halar has a free energy of about $31 \times 10^{-3}$ joules/meter$^2$.

TABLE 2

| Ingredient | Manufacturer | Weight % |
|---|---|---|
| Hycar 4054 | B. F. Goodrich Company | 43.0 |
| DPDA 6182 | Union Carbide Corp. | 10.8 |
| Agerite Stallite S | R. T. Vanderbilt Co., Inc. | 1.1 |
| Processing Aids |  | 4.9 |
| Conductex 975 | Columbia | 40.2 |

Hycar 4054 is a low temperature resistant acrylic ester copolymer with a Mooney viscosity, ML-4 (100° C.) of 25-40.
DPDA 6182 is an ethylene-ethyl acrylate copolymer with ethyl acrylate content of 14.5%, melt index 1.5 g/10 min., and density 0.930 g/cc.
AGERITE STALLITE S is an antioxidant, mixture of alkylated diphenylamines.
CONDUCTEX 975 is a high surface area carbon black with high electrical conductivity.

EXAMPLE 4

A device was made in the same way as in Example 3 except that the outer briad was made by braiding 32 poly(trifluorochloroethylene) monofilaments, each having a diameter of about 10 mils, instead of the glass fiber yarns.

EXAMPLE 5

A device was made in the same way as in Example 3 except that the outer braid was made by braiding 32 metal ("Copel") wires each having a diameter of about 10 mils instead of the Halar filaments. Copel has a free energy well above $100 \times 10^{-3}$ joules/meter$^2$.

EXAMPLE 6

A device was made in the same way as in Example 3 except that the outer braid was made by braiding 96 tin-plated copper wires each having a diameter of about 4 mils instead of the Halar filaments.

EXAMPLE 7

A device was made in the same way as in Example 4 except that the swellable composition was as shown in Table 3 below.

TABLE 3

| Ingredient | Manufacturer | Weight % |
| --- | --- | --- |
| Vistalon 503 | Exxon Chemical Company | 45.2 |
| Vistalon 707 | Exxon Chemical Company | 11.3 |
| Agerite Resin D | R. T. Vanderbilt Co., Inc. | 0.6 |
| Conductex 975 | Columbia | 39.5 |
| Sunpar 2280 | Sun Oil Company | 2.8 |
| Radiation cross-linking agent | | 0.6 |

VISTALON 503 is an ethylene-propylene copolymer with an ethylene content of 50% and Mooney Viscosity ML1 + 8 @ 100° C of 50.
VISTALON 707 is an ethylene-propylene copolymer with ethylene content of 65% and Mooney Viscosity ML1 + 8 @ 100° of 20
AGERITE RESIN D is polymerized 1,2-dihydro-2,2,4-trimethylquinoline antioxidant
CONDUCTEX 975 (See above)
SUNPAR 2280 is a plasticizer oil of paraffinic nature, having a predominance of saturated rings and long paraffinic side chains (55% min Cp)

Table 4 below shows the time taken (average of 5 samples) for the resistance of the device prepared in Example 4 to fall to 20,000 ohms when tested in various liquids by the procedure of Example 1.

TABLE 4

| Liquid | Time (mins) |
| --- | --- |
| Methyl ethyl ketone | 23 |
| Trichloroethylene | 11 |
| Xylenes | 23 |
| Isopropyl alcohol | 406 |
| Heptane | 216 |
| Unleaded gasolene | 44 |

Table 5 below shows the time taken (average of 2 samples) for the resistance of the device prepared in Example 7 to fall to 20,000 ohms when tested in various liquids by the procedure of Example 1.

TABLE 5

| Liquid | Time (mins) |
| --- | --- |
| Unleaded gasolene | 6 |
| JP-7 jet fuel | 24 |
| Xylenes | 12 |

Table 6 below shows the times taken for the resistances of the devices of Examples 2(A), 3, 4, 5 and 6 to fall to 20,000 ohms when tested in toluene by the procedure of Example 1 before and after immersion in water. Table 6 also shows the area of each of the apertures in the braids ($A_{aperture}$) and the ratio of the total area of the surface of the swellable member to the area of the swellable member not contacted by the braid (A*).

TABLE 6

| Ex. No. | A* | $A_{aperture}$ meter$^2$ × 10$^{-7}$ | Time (mins) before immersion | Time (mins) after immersion |
| --- | --- | --- | --- | --- |
| 2 | ∞ | 0 | 11 | 62 |
| 3 | 2.7 | 6.97 | 27 | not tested |
| 4 | 8.4 | 1.56 | 10 | 12 |
| 5 | 5.1 | 3.46 | 14 | 20 |
| 6 | 6.3 | 3.67 | 11 | 20 |

We claim:

1. An elongate sensor which is suitable for use in an electrical circuit for detecting and locating the presence of a fluid at any point along the length of the sensor, and which comprises
   (i) a first elongate conductive member;
   (ii) a second elongate conductive member which is spaced apart from the first member in the presence of the fluid and in the absence of the fluid, and which is electrically insulated from the first member along the length of the sensor in the absence of the fluid; and
   (iii) an elongate swellable conductive bridging member
      (a) which is spaced apart from and electrically insulated from at least one of the first and second members along the length of the sensor in the absence of the fluid; and
      (b) at least a part of which, when the fluid is present at any point along the length of the sensor, becomes swollen at that point, and makes an electrical connection between the first and second conductive members at that point.

2. A device for detecting the presence of a fluid, said device comprising
   (i) a support core having a uniform cross-section along its length;
   (ii) a spacer member;
   (iii) a first conductive member;
   (iv) a second conductive member which is hollow and surrounds the support core, spacer member and first conductive member; and
   (v) a swellable member which swells in the presence of the fluid;
   wherein the spacer member projects outwardly from the support core a greater distance than the first conductive member such that, in the absence of the fluid, the spacer member spaces the first and second conductive members from each other.

3. An elongate sensor which is suitable for use in an electrical system for detecting and locating the presence of a fluid at any point along the length of the sensor, and which comprises
   (1) an elongate swellable member which swells when the fluid is present at any point along the length of the sensor and which is composed of an elastomeric material comprising a substantially saturated, cross-linked ethylene-propylene elastomer; and
   (2) an elongate restraining member which, when the swellable member swells in the presence of the fluid to be detected, substantially restricts movement of the swellable member in one direction so that movement of the swellable member in another direction causes the electrical impedance of the device to change.

4. An elongate sensor which is suitable for use in an electrical circuit for detecting and locating the presence of a fluid at any point along the length of the sensor, and which comprises
   (1) a first elongate conductive member;
   (2) a swellable elongate conductive member which is electrically insulated from the first conductive member along the length of the sensor in the absence of the fluid and which, when fluid is present at any point along the length of the sensor, swells at that point; and
   (3) a restraining member which, when the swellable member swells in the presence of the fluid, substantially restricts movement of the swellable member in one direction so that movement of the swellable member in another direction causes an electrical connection to be made between the first conductive member and the swellable member;
   at least one of the first conductive member and the swellable member comprising a conductive polymer.

5. An elongate sensor which is suitable for use in an electrical circuit for detecting and locating the presence of a fluid at any point along the length of the sensor, and which comprises (1) a first elongate conductive member;
(2) a second elongate conductive member which is insulated from the first conductive member along the length of the sensor in the absence of the fluid;
(3) an elongate swellable member which swells in the presence of the fluid; and
(4) an elongate apertured restraining member which
  (a) comprises a plurality of apertures which are spaced apart along the length of the restraining member and through which, when the sensor is exposed to the fluid, the fluid can pass into contact with the swellable member, and
  (b) when the swellable member swells as a result of the presence of the fluid at any point along the length of the sensor, substantially restricts movement of the swellable member in one direction so that movement of the swellable member in another direction causes an electrical connection to be made between the first and second conductive members at said point where the fluid is present;
at least one of the first and second conductive members and the swellable member comprising a conductive polymer.

6. A sensor according to claim 1 which also comprises
  (iv) an elongate support core, and
  (v) an elongate spacer member which is positioned between the first and second conductive members and projects outwardly from the core a greater distance than the first conductive member so that, in the absence of the fluid, the spacer member spaces the first conductive member from the second conductive member and from the bridging member.

7. A sensor according to claim 6 wherein the bridging member is hollow and surrounds the support core, the spacer member, and the first and second conductive members.

8. A sensor according to claim 7 wherein the support core and the spacer member are provided by a cylindrical member comprising channels in which the first and second conductive members are positioned.

9. A sensor according to claim 7 wherein the spacer member and the first and second conductive members are wrapped around the support core; the support core has a uniform cross section along its length; and the bridging member is in the form of a tube.

10. A sensor according to claim 9 which also comprises
  (vi) an elongate apertured restraining member which, when the bridging member swells in the presence of the fluid to be detected, substantially restricts radially outward movement of the swellable member.

11. A sensor according to claim 10 wherein the restraining member is a braid comprising a plurality of filamentous members.

12. A sensor according to claim 10 wherein, when the sensor is immersed in fluid, the surface of the restraining member which is contacted by the fluid is composed of a material having a free energy of less than $65 \times 10^{-3}$ joules/meter$^2$.

13. A sensor according to claim 10 wherein, when the sensor is immersed in fluid, the surface of the restraining member which is contacted by the fluid is composed of a material having a free energy of less than $45 \times 10^{-3}$ joules/meter$^2$.

14. A sensor according to claim 10 wherein each of the first and second conductive members comprises a metal core surrounded by a conductive polymer.

15. A sensor according to claim 10 wherein the bridging member comprises a conductive polymer in which the polymeric component comprises
  (i) a first substantially saturated polymeric component which is amorphous, and
  (ii) a second substantially saturated polymeric component which is crystalline.

16. A sensor according to claim 10 wherein the bridging member comprises a conductive polymer in which the polymeric component comprises an acrylic elastomer.

17. A sensor according to claim 10 wherein the bridging member comprises a conductive polymer in which the polymeric component comprises a substantially saturated, crosslinked amorphous elastomer.

* * * * *